United States Patent [19]

Snyder

[11] Patent Number: 5,343,514
[45] Date of Patent: Aug. 30, 1994

[54] TELEPHONE LINE POWERED SYSTEM

[76] Inventor: Gary K. Snyder, 1011 E. Calle Monte Vista Dr., Tempe, Ariz. 85284

[21] Appl. No.: 164,922

[22] Filed: Dec. 10, 1993

[51] Int. Cl.⁵ .......................................... H04M 11/00
[52] U.S. Cl. ..................................... 379/93; 379/387; 379/413; 235/380
[58] Field of Search ............... 379/91, 144, 93, 96–99, 379/90, 387, 399, 413; 235/380, 375, 379; 902/8, 22, 24, 25

[56] References Cited

U.S. PATENT DOCUMENTS

| | | | |
|---|---|---|---|
| 4,636,587 | 1/1987 | Zoerner | 379/387 |
| 4,750,201 | 6/1988 | Hodgson et al. | 379/91 |
| 4,790,006 | 12/1988 | Nijmolen et al. | 379/387 |
| 4,918,726 | 4/1990 | Snyder . | |
| 5,113,434 | 5/1992 | Fox | 379/413 |
| 5,155,764 | 10/1992 | Malaurie et al. | 379/413 |
| 5,181,240 | 1/1993 | Sakuragi et al. | 379/413 |

Primary Examiner—Wing F. Chan
Attorney, Agent, or Firm—LaValle D. Ptak

[57] ABSTRACT

A telephone line powered system operates in conjunction with a user telephone, and is fully biased off whenever the user telephone is in an "on-hook" condition. When the user telephone is placed in an "off-hook" condition, a hookswitch is operated to cause the system to be supplied with a relatively low level of stand-by power from the telephone line. A micro controller is energized by this stand-by power, and initializes the system. Higher power consuming devices, such as a card reader, a DTMF dialer and the like, remain biased off by the micro controller during the stand-by mode of operation. If information is to be transmitted from the card reader or from an auxiliary program, which is accessed by direct access keys, a switch is closed which causes the micro controller to disable the telephone and to power up the higher power consuming devices. Once operation of the higher power consuming devices is completed, the micro controller causes the system to revert back to its stand-by mode of operation; and control of the telephone line is returned to the user telephone. During the stand-by mode of operation, the power consumption is sufficiently low that the system is essentially transparent to the user telephone.

7 Claims, 4 Drawing Sheets

| FIG. 4A | FIG. 4B |

TELEPHONE LINE POWERED SYSTEM

BACKGROUND

A number of different products have been developed for use in conjunction with telephone lines, which operate either in parallel with a standard telephone or in place of a telephone, to send and/or receive information over the telephone line. Such products include automatic telephone answering machines, card readers, check verification devices, pre-programmed automatic dialers, and the like. Generally, power for operating these products is obtained from a power supply connected to the available alternating current power in the building or location where the product is used. Operating power for such products is not obtained from the telephone line; so that it is necessary to locate the products near a suitable wall outlet, or otherwise provide operating power in some way to these devices to permit them to send and/or receive signals over the telephone line.

U.S. Pat. No. 4,918,726 is directed to a card reader, which obtains all of its operating power directly from the telephone line itself; so that no additional or separate power supply connected to a source of power in the building is required. In the system of U.S. Pat. No. 4,918,726, the card reader is supplied with full operating power from the telephone line at all times. This is true whether the telephone associated with the reader is in its "on-hook" or in its "off-hook" condition. The amount of current which is drawn by the reader is relatively low, on the order of five milliamps. As a consequence, the reader is essentially "transparent" to a person using the telephone associated with the same line to which the reader is connected. Under some conditions of operation however, the power drawn by the reader can degrade the performance of the telephone on the line with which it is associated. The drawing of full operating power during the extended time periods when neither the telephone nor the reader are in operation, presents a small but steady drain of power from the telephone line.

It is desirable to provide a telephone line powered system, which is essentially transparent to a telephone on the line, and which operates in a low power mode until operation is initiated, whereupon a switch over to full power from the telephone line automatically is effected, with a subsequent return to a low power stand-by mode of operation.

SUMMARY OF THE INVENTION

It is an object of this invention to provide an improved telephone line powered system.

It is an additional object of this invention to provide an improved telephone line powered system which permits "transparent" operation with a telephone on the same line.

It is another object of this invention to provide an improved telephone line powered system which is placed in a low power stand-by mode until operation is required, at which time a higher power operating mode, drawing increased power from the telephone line, takes place.

It is a further object of this invention to provide an improved telephone line powered card reader which is placed in a low power stand-by or ready mode of operation when the associated telephone goes "off-hook" and which switches to a full power mode when information transfer between the device and the telephone line is required.

In accordance with a preferred embodiment of this invention, a telephone line powered device, for use in conjunction with a telephone connected to the telephone line, includes a control system which is placed in a stand-by or ready mode of operation when the telephone on the line goes "off-hook". This stand-by mode of operation is a low power mode, which essentially permits the device to be "transparent" to the user of the telephone on the same line. When the device is to be used for communication on the telephone line, it is operated to disable the associated telephone. It then seizes control of the line during the operation of the device. In this mode of operation, the device switches to a full or higher power mode, drawing increased power from the telephone line. After operation of the device, the telephone is enabled for normal exchange on the telephone line; and the device reverts back to its stand-by mode of operation.

DETAILED DESCRIPTION

Reference now should be made to the drawings, in which the same reference numbers are used in the different figures to designate the same components.

Figure 1:
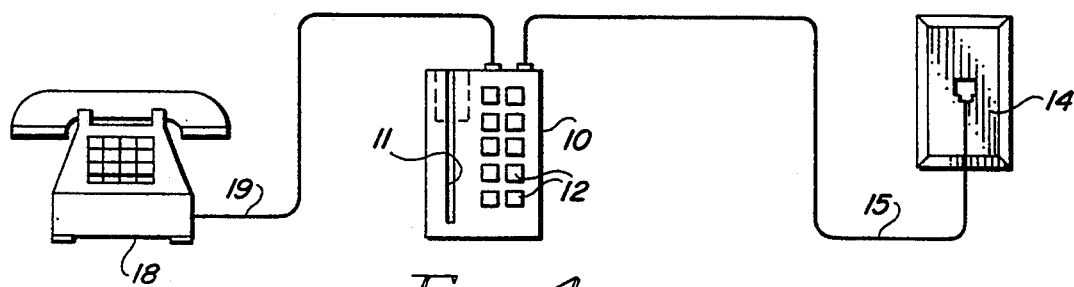
FIG. 1 is a diagrammatic representation of a preferred embodiment of the invention.

FIG. 1 is a diagrammatic representation of the circuit interconnections of a preferred embodiment of the invention. As illustrated in FIG. 1, a telephone line powered device 10, such as a credit card reader, having a card reading slot 11 in it and several pre-programmed push buttons 12 is illustrated. The device 10 is connected through a conventional wire telephone cable 15 to a telephone wall outlet 14. A telephone 18 then is connected by means of a multiple wire telephone cable 19 to the card reader 10.

In the system disclosed in FIG. 1, all of the operating power for both the telephone 18 and the card reader 10 is obtained from the telephone line over the cable 15, which is plugged into a standard telephone jack 14. As described in greater detail subsequently, when the telephone 18 is "on-hook", as shown, the card reader device 10 does not draw any power from the telephone line 15, which is plugged into the wall outlet jack 14. Ring signals over the line 15, however, are transferred through the device 10 to the line 19; so that the telephone 18 may be operated in its normal manner. When the receiver of the telephone 18 is taken off-hook, the device 10 is operated to a "stand-by" or "sleep" mode of operation, preparing it for use. In this mode, only a small amount of power is drawn from the line 15. The current flow for the reader 10 in this "stand-by" mode of operation typically is two milliamps or less.

Figure 2:
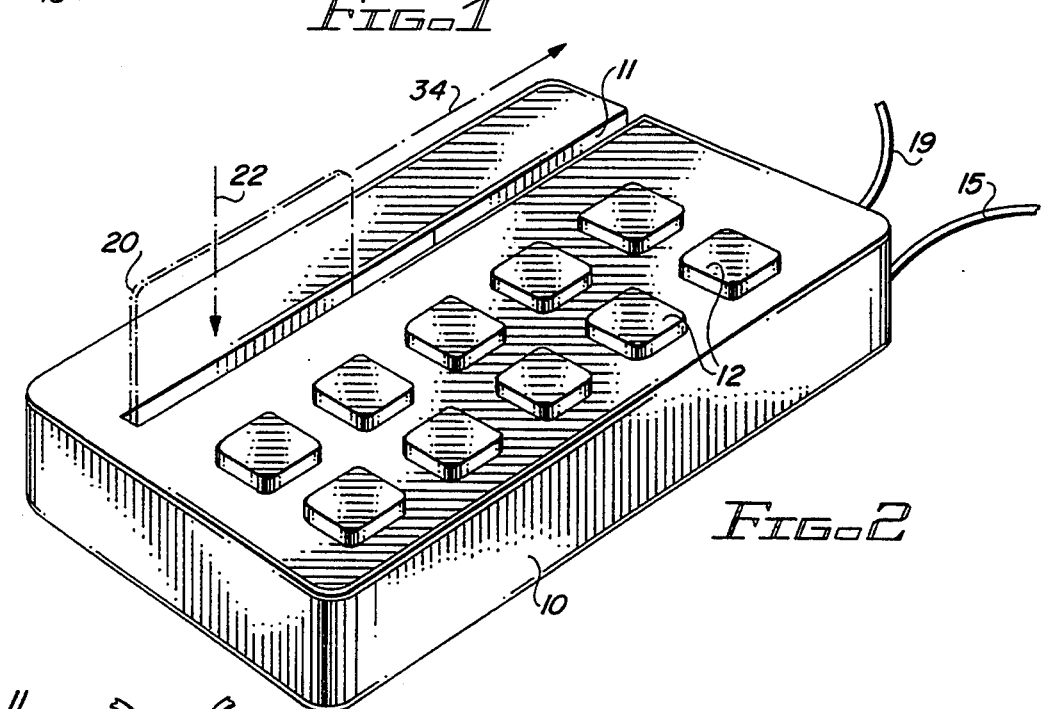
FIG. 2 is a perspective view of the housing of a device constructed in accordance with the preferred embodiment of the invention.
Figure 3:
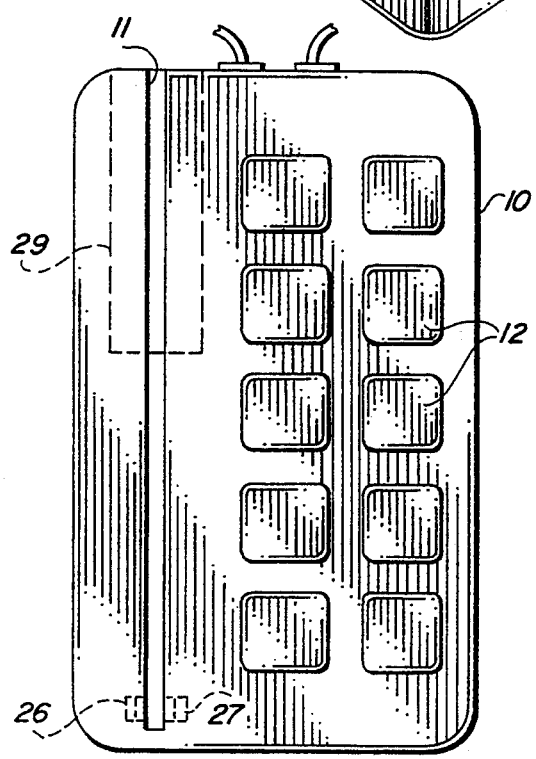
FIG. 3 is a top view of the device of FIG. 2.
Figure 4A:
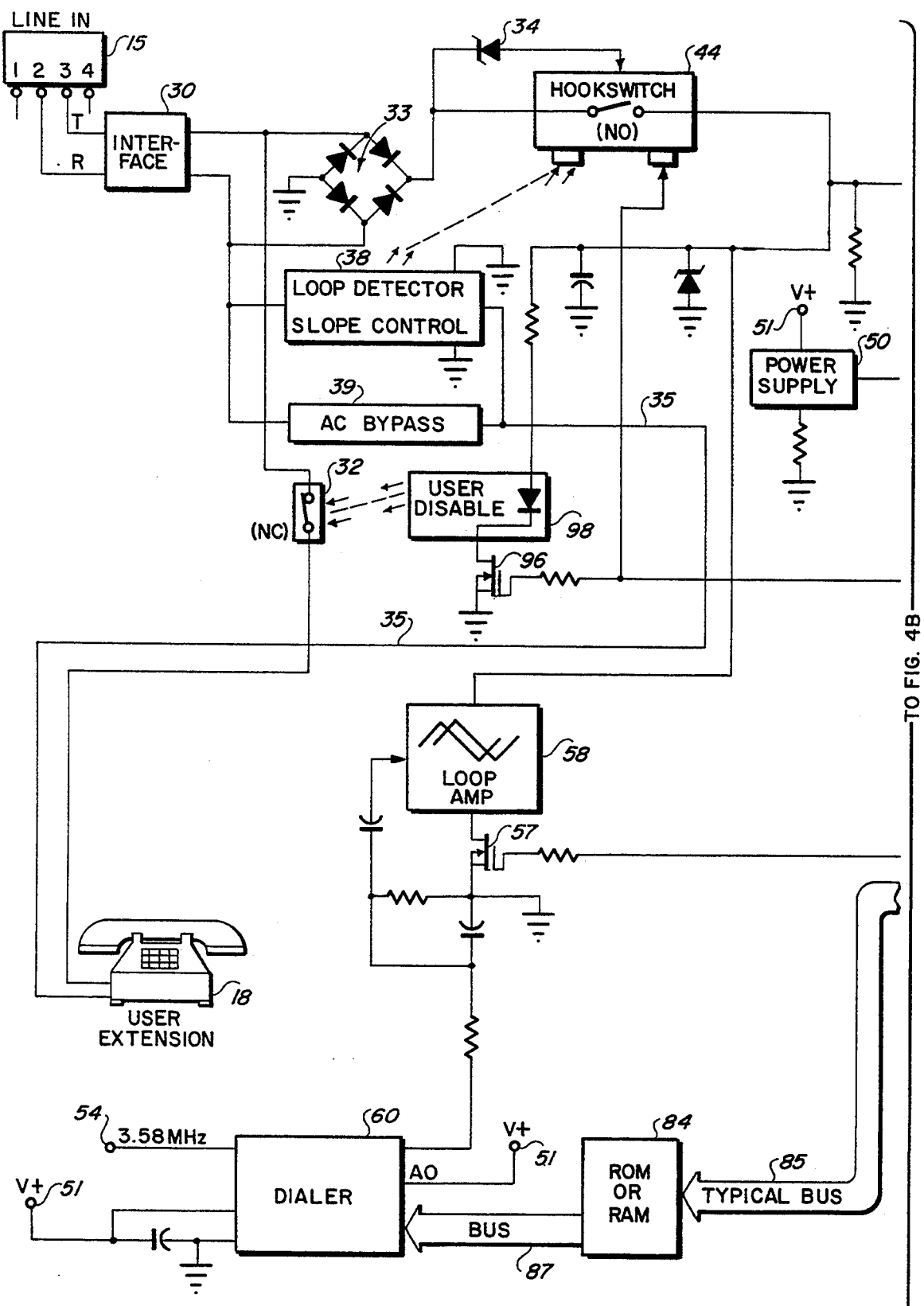
FIGS. 4A and 4B together comprise a schematic diagram of the preferred embodiment of the invention.
Figure 4B:
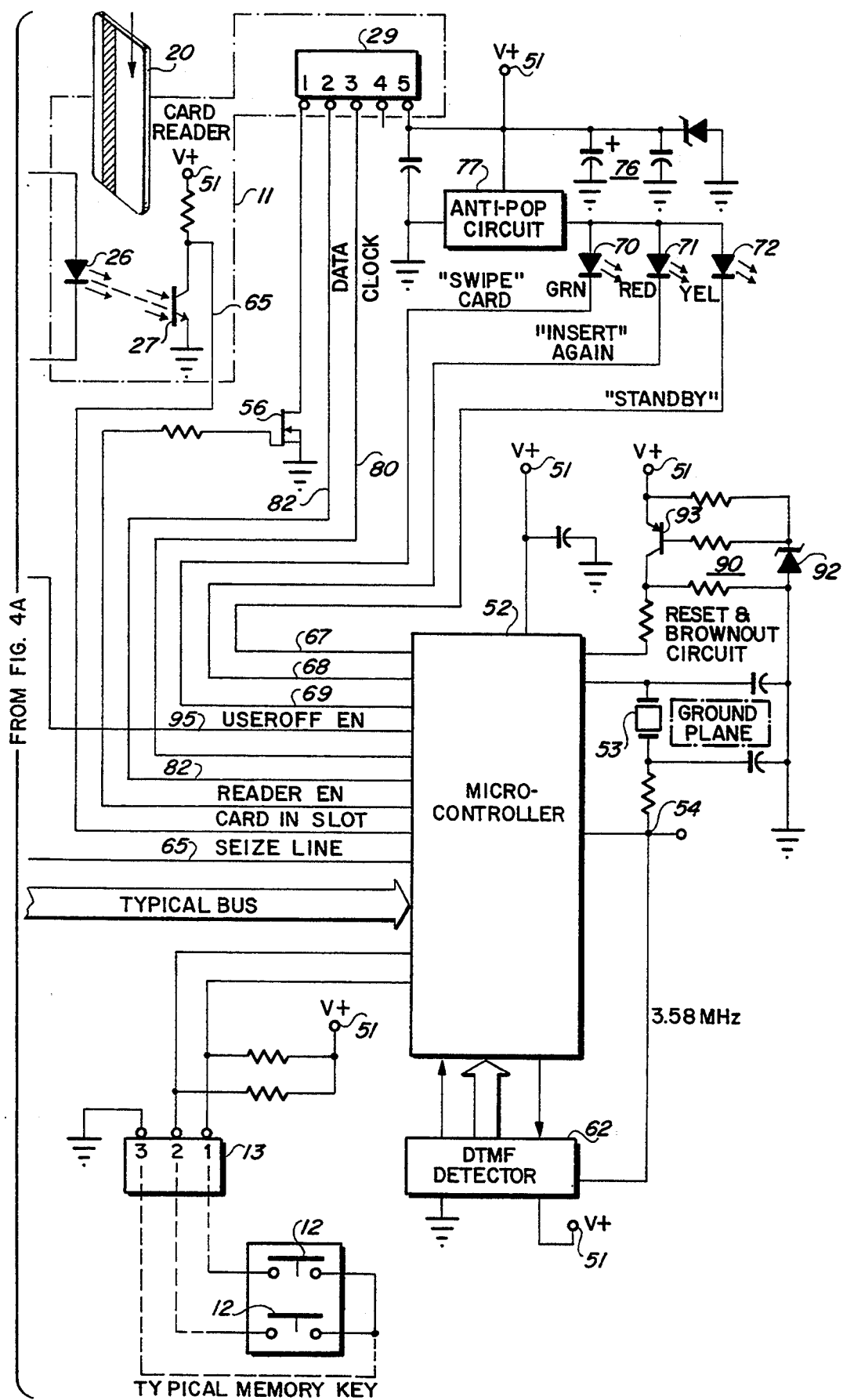

As illustrated in FIGS. 2 and 3, when use of the reader 10 for transmitting information from a credit card is desired, the card 20 is inserted downwardly in the left-hand or lower end of the slot 11 in the direction of the arrow 22. When this occurs, a light path between a light-emitting diode 26 and a light-responsive switch 27 is broken. Circuity, which is shown in FIGS. 4A and 4B in greater detail, then is operated to cause full operating power to be drawn from the telephone jack 14 over the line 15 to operate the card reader 10. As described subsequently, when this occurs, the telephone 18 is disabled by opening the line 19; and this condition remains until operation of the device 10 is completed. Once that operation is completed, the device 10 reverts back to its low power mode and the telephone 18 is re-connected to operate in a normal manner over the telephone line connected to the jack 14.

Figure 5:
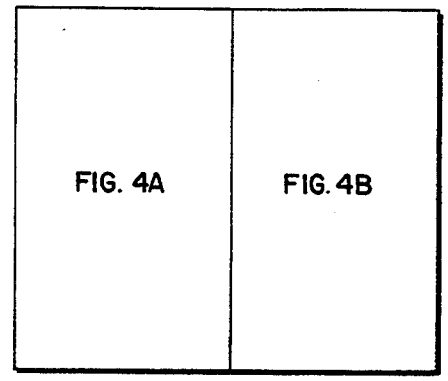
FIG. 5 illustrates the manner in which FIGS. 4A and 4B interconnect to form the complete schematic diagram of the preferred embodiment of the invention.

Reference now should be made to FIGS. 4A and 4B, interconnected together as shown in FIG. 5, which comprise a detailed block diagram of the system described above in conjunction with FIG. 1 through 3.

In FIG. 4A, the telephone line 15 of FIG. 1 is shown at the interconnection jack for the card reader system 10. The circuitry shown in FIGS. 4A and 4B all is included within the housing 10, with the exception of the telephone 18, shown in the lower left-hand corner of FIG. 4A. In the system illustrated, only a single telephone line is involved, so only the tip and ring wires of the line/jack 15 are used. These wires are connected to an interface 30, which includes a protective fuse. The output of the interface 30 is supplied to a full wave rectifier 33. The output of the interface 30 also is supplied through a normally closed "user disable" switch 32 to one of the two leads connected to the telephone 18. The other of these two leads is the lead and it is connected through an AC bypass unit 39 to the other side of the interface 30.

When the telephone 18 is "on-hook", a relatively high voltage from the central office is available on the incoming line 15. This voltage is rectified by the full wave rectifier 33, and is applied through a voltage threshold Zener diode 34 to a hookswitch circuit 44. As is well known, the "on-hook" voltage on a telephone line is considerably greater than the "off-hook" voltage during use of a telephone connected to that line. Typically, the on-hook voltage ranges from 24 to 48 Volts DC, as rectified by the rectifier 33, whereas the off-hook voltage drops to a range of between 6 Volts to 13 Volts. Consequently, the threshold of the Zener diode 34 is set to be below the lowest "on-hook" voltage and above the highest "off-hook" voltage. For the example under consideration, a typical threshold voltage for the Zener diode 34 is 15 Volts.

When the system is "on-hook", that is when the user extension telephone 18 either is awaiting an incoming call or an outgoing call, the central office on-hook voltage exceeds the threshold of the Zener diode 34 and is applied to the hookswitch circuit 44. The circuit 44, in this condition, operates to open the hookswitch which constitutes a normally open (NO) switch during the "on-hook" condition of operation of the system.

Whenever the user extension telephone 18 is placed "off-hook", either to receive an incoming call or to initiate an outgoing call, the voltage drop from the central office falls below the threshold value of the Zener diode 34. This causes the hookswitch circuit 44 for the telephone line powered system of FIGS. 4A and 4B to be prepared for operation.

Figure 6:
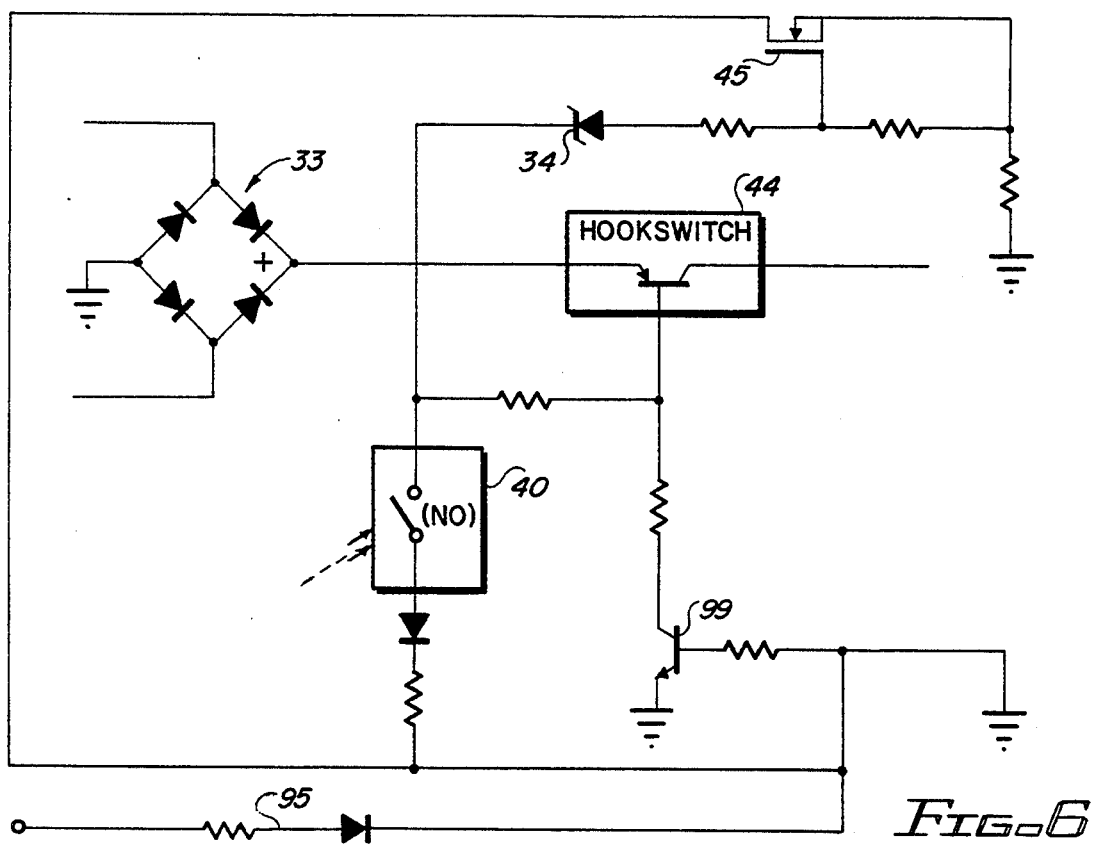
FIGS. 6 and 7 illustrate alternative details of a portion of the circuit of FIGS. 4A and 4B.
Figure 7:
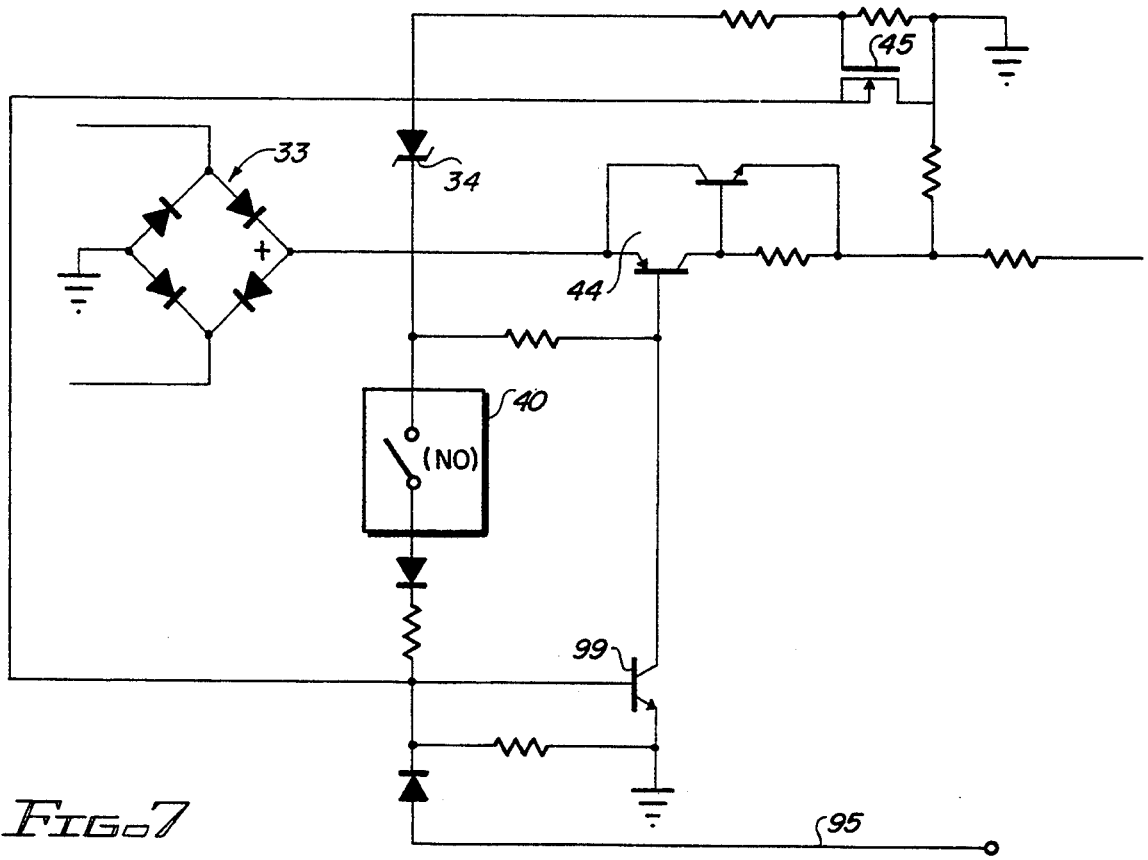

When the telephone 18 goes "off-hook" it causes current to flow through a loop detector and slope control circuit 38 (which may include another full wave rectifier similar to the rectifier 33 and a light-emitting diode). The loop detector and slope control circuit 38 is activated to supply light to a normally open, light-responsive switch 40 (FIGS. 6 or 7) in the hookswitch circuit 44 to close the switch 40, and therefore, the hookswitch 44. The switch 40, as indicated in FIGS. 6 and 7, is operated as a first hook switch control for the system.

In summary, whenever the receiver of the extension telephone 18 goes "off-hook", the rectified voltage available on the telephone line is applied from the full wave rectifier 33 through now closed hookswitch 44 to supply current through the light-emitting diode 26 of the card reader 10 described previously in conjunction with FIGS. 2 and 3, which in turn is connected in series with a system power supply circuit 50. Typically, the power supply circuit 50 comprises a high value resistor connected between the cathode of the light-emitting diode 26 and ground, with the positive power supply V+ shown on terminal 51 obtained from the junction of the cathode of the light-emitting diode 26 and that resistor. The size of the resistance in the power supply 50 is selected to cause a low current draw (on the order of 1.0 to 2.0 MA) from the telephone line 15.

The light from the light-emitting diode 26 energizes the light responsive switch 27, illustrated as an NPN optical transistor, to drive the switch 27 into conduction. This causes current to flow from the power supply 51 through a high value resistor and the switch 27 to ground. The amount of current flowing in this path also is very low, on the order of 1.0 to 2.0 MA.

The collector of the optical transistor switch 27 is connected to an on/off control line 65 connected to a micro controller microprocessor 52. So long as near ground potential appears on the line 65, the micro controller 52 is turned off and draws no power. When the micro controller 52 is in its non-energized "off-hook" condition, three power saver MOSFET switches 56, 57 and 96 are biased to a state of non conduction; so that other portions of the line powered system of FIGS. 4A and 4B do not operate.

When the circuit is in the mode of operation which has just been described, it is in a "stand-by" or "sleep" mode. The amount of current which is drawn through the light-emitting diode 26 and the optical transistor 27 (along with the associated circuitry described) is typically less than 5.0 MA. As a consequence, this low power drain on the telephone line at the line/jack 15 is not noticed by a person using the extension 18. The amount of voltage drop is insignificant, and is less than that which is caused by a second extension on the same line as the user extension 18 illustrated in FIG. 4A. This causes the telephone line powered system of FIGS. 4A and 4B essentially to appear as "transparent" to the user extension telephone 18 for any conventional operation of the extension 18, which does not require any operation or input from the remainder of the circuit shown in FIGS. 4A and 4B.

At such time as the user extension 18 once again goes "on-hook", the hookswitch 44 is opened, since light transmission to the optical switch 40 (FIGS. 6 and 7) by the loop detector and slope control 38 is terminated. Similarly, the "on-hook" condition of the telephone 18 causes the threshold of the Zener diode 34 to be exceeded. This causes a power disable FET transistor 45

(FIGS. 6 and 7) in the hookswitch control circuit 44 to be rendered conductive to bias off a control transistor 99 which, in turn, turns off the hookswitch transistor 44. Thus, no power whatsoever is supplied to the light-emitting diode 26 and power supply 50, or through the optical switch 27; so that the system once again does not draw any power from the telephone line whenever the user extension 18 is "on-hook".

Assume now, however, that the "off-hook" condition which has been described above is in effect; so that the low power mode of operation of the system exists. This is the condition when the hookswitch 44 in the hookswitch circuit is closed; so that power is supplied through the power supply 50 and the terminal 51 to the various circuit components shown in FIGS. 4 and 4B.

If, when the system is in this "stand-by" or "sleep" mode of operation a card 20 is inserted into the slot 11 in the device 10 in the position shown in FIGS. 2 and 3, the card breaks the light path between the light-emitting diode 26 and the optical transistor 27. This causes the transistor 27 to be rendered non-conductive. Consequently, the voltage on the lead 65 rises to the full voltage of the power supply at the terminal 51; and this voltage applied to the micro controller 52 causes the micro controller to be rendered operative. Operating power for the micro controller 52 is obtained from the power supply from the terminal 51, as indicated in FIG. 4B. When the micro controller 52 is thus "powered up", the reader is enabled by a signal applied to the gate of the MOSFET transistor 56 driving it conductive.

Clock signals for synchronizing the operation of the micro controller and card reader are supplied to the card reader over a clock lead 80. The clock signals are obtained from a crystal oscillator circuit including a crystal 53 connected to the micro controller 52 on a lead 54. These clock signals at 3.58 MHz also are used in other parts of the circuit for synchronization of the circuit. A ground plane is used to isolate the crystal 53 and dialer from the rest of the circuit to prevent these signals from being transmitted over the telephone line from the circuit. The manner in which this shielding is accomplished is standard, and is not of importance to an understanding of the overall system operation of the line powered system disclosed.

When the presence of a card in the slot 11 is sensed by causing the optical transistor 27 to be rendered non-conductive, a signal is supplied from the micro controller 52 over a lead 69 to allow current to flow through a green light-emitting diode (LED) 70, which is coupled to a filter circuit 76 and an anti-pop circuit 77 to cause the diode 70 to repeatedly flash a bright green signal. This indicates to the user of the system that the system is ready for a card 20 to be moved through the slot 11 to swipe it past the reader 11. Data obtained from swiping the card across the terminals of the card reader (which may be any suitable commercially available type) is supplied to the micro controller over a data lead 82. If a valid read is obtained, the micro controller 52 causes the system to operate in accordance with the data read from the card.

If for some reason the swiping of the card through the reader 11 did not provide usable data as recognized by the micro controller 52, a signal is supplied from the micro controller over a lead 68 to energize a red LED diode 71. At the same time, the green diode 70 is turned off. The red diode flashes and a label on the face of the device 10 (of FIGS. 2 and 3) may include instructions to "insert again". If on a subsequent reading of the card, the data is correct, the micro controller 52 then proceeds to control operation of the system in accordance with that data.

It should be noted that whenever the micro controller 52 is processing data which has been read from the card reader, the green and red LEDs 70 and 71 both are turned off, and a yellow LED 72 is turned on to provide a flashing yellow signal, which may be identified by a "stand-by" indicia to indicate that the system is not ready for the reading of a new card, but is processing data as a result of the reading just effected.

The data processing itself is accomplished by means of a ROM or RAM memory 84 connected to the micro controller 52 by a two-way communications bus 85. Information or instructions from the card reader, as well as specific data on that reader, are used in conjunction with the memory 84 to control the operation of a dialer 60 over a bus 87. Some of the information on the bus 87 is obtained directly from the memory 84, while other control information is obtained from the micro controller 52 and is supplied to the dialer 60 in synchronism with the operation of the memory 84. It should be noted that the dialer 60 is provided with operating potential from the power supply terminal 51 and that its operation is synchronized by the clock signals obtained from the oscillator 53 on the clock lead 54.

To permit the dialer 60, however, to supply signals (either pulse or tone), the micro controller 52, when the "card in slot" indication is used to switch it on to its "high power" mode, applies a signal to the gate of the MOSFET power saver transistor 57 to cause the transistor 57 to be rendered conductive. Similarly, the MOSFET transistor 96 is rendered conductive.

When the transistor 96 is rendered conductive, current flows from the full wave rectifier 33 through the now closed hookswitch 44 and through a user disable light-emitting diode 98. Light from the user disable diode 98 is applied to a normally closed optical switch 32 to open the switch 32. When this occurs, the user extension telephone 18 is disconnected from interfacing or operating on the telephone line, as is readily apparent. Thus, when the telephone line powered system of FIGS. 4A and 4B is operated in its higher power or full power mode, that operation cannot have any adverse effect on the extension telephone 18, since the telephone 18 effectively is disconnected during the time the micro controller 52 seizes control of the system.

Simultaneously with the disconnection of the telephone 18 by the operation of the disable light-emitting diode 98, the signal on the lead 95, which rendered the transistor 96 conductive, also is applied to the hookswitch control circuit shown in FIGS. 6 and 7 as a forward-biasing potential on the base of the NPN control transistor 99, causing the transistor 99 to be rendered conductive. As a consequence, the hookswitch 44 continues to be forward-biased (closed) to apply operating power for the various components of the system. This operation occurs even though the optical hookswitch control switch 40 is opened upon disconnection of the telephone 18.

The high power for operating all of the various system components during this time of operation continues to be obtained through the hookswitch 44, which is connected on one side to the output of full wave rectifier 33 and directly to the anode of the light-emitting diode 26 to continue to supply power to the diode 26. Closure of the hookswitch 44 is maintained by the transistor 99 before the control switch 40 opens by failure of current flow to continue to take place through the loop detector and slope control circuit 38, as a result of the opening of the switch 32 in the user extension telephone circuit. Consequently, power continuously is supplied to the micro controller circuit, and the additional power, which is used by the other circuit components on FIGS. 4A and 4B, is drawn directly from the telephone line. This additional power is considerably more than the lower power "stand-by" power, which is drawn through the light-emitting diode transistor circuit 26 and the optical switch transistor 27 at all other times when the user extension telephone 18 is "off-hook". When the transistor 57 is rendered conductive, a loop amplifier 58 is rendered operative to supply the signals generated by the dialer 60 to the telephone line 15. This amplifier first functions to steal line current from the telephone 18 prior to the shut off of the telephone 18. Then the DTMF tone signals are injected by the amplifier 58 to the line 15.

Once the micro controller 52 has seized control of the telephone line and the user disable light-emitting diode 98 has been energized, signals from sources other than a card reader may be supplied through the micro controller to the telephone line. For example, the memory keys 12 may be operated to close a control circuit, as shown at the bottom of FIG. 4B to the micro controller 52 to access a particular address in the memory 84 for supplying a route script or activation of a program mode in accordance with the stored information and the operation of the micro controller 52. The route script permits enabling of internal stored dialing strings to be dialed out sequentially by the dialer 60 in response to the operation of the micro controller 52 and the memory 84. The dialing strings may include password, serial ID code, pauses, destination number, and PBX access codes for example. While a typical memory key 12 operating through a connector block 13 is illustrated in FIG. 4B, entry from other devices may be effected in any desired manner by supplying appropriate signals to the micro controller 52. For example, the micro controller 52 may be connected with an off-premise DTMF modem, which automatically programs the computer. For example, this may be effected through a DTMF detector 62, which is illustrated in the lower right-hand corner of FIG. 4B.

After the dialer mode of operation, in which the micro controller 52 in conjunction with the memory 84 operates the dialer 60, is complete, or after a program mode is complete, the micro controller, through its internal programming, returns the system to the "stand-by" or "sleep" mode. Once again, this causes the power saver MOSFET transistors 56, 57 and 96 to be turned off or rendered non-conductive. As a consequence, the power hungry DTMF amplifier, the card reader power supply, the LEDs, and the tone detectors are shut off. The telephone 18 is turned back on, and control of the hookswitch 44 reverts back to the slope control 38 and the control switch 40. Finally, the power supply voltage on the terminal 51 from the power supply 50 is reduced to a minimum level since the current flowing through the power supply is reduced to the low stand-by current. Once the micro controller 52 returns to the stand-by or sleep mode, the micro controller 52 requires very little current and very little voltage. It should be noted that the active components of the system in the stand-by or sleep mode include the micro controller 52, the sensor light-emitting diode 26, the optical switch transistor 27, and the keyboard or memory key unit 12. The micro controller 52 then continuously monitors the sensor consisting of the diode 26 and optical switch 27 and the array of the keyboard memory keys 12 to determine if a card has been inserted into the card slot 11, or if a memory key 12 has been pushed.

It should be noted that when the micro controller 52 is in its "stand-by" or "sleep" mode, it can be activated to its full power or higher power of operation by depressing any one of the memory keys 12. The effect of this operation is the same as the insertion of a card 20 to break the light path between the light-emitting diode 26 and the optical transistor 27 when the card reader is activated. As mentioned above, the depression of a memory key 12 may be used as a memory dialer to access a location, or it may be used to activate a sequence of events which is a program mode or password entry. A valid key depression of any of the keys 12 activates the micro controller 52 to its "full power" mode of operation. Thus, the MOSFET transistors 56, 57 and 96 are turned on to apply full operating power to the power hungry portions of the circuit and to disconnect the telephone 18, as described previously.

When the micro controller 52 times out after any one of the above dialing and information transfer sequences has been completed, the turning off or non-conduction of the MOSFET transistor 96 causes the user disable light-emitting diode 98 also to be turned off. As a consequence, the normally closed switch 32 reverts back to its closed state. Thus, further "off-hook" operation through the telephone 18 causes the control switch 40 once again to be closed by operation of the loop detector and slope control circuit 38; so that the system reverts back to its original "stand-by" or "sleep" mode of operation, as previously described. Insertion of another card, or operation of any of the memory keys 12 causes the switch over to full power operation described above to take place.

As stated earlier, when the user extension 18 is placed back in the "on-hook" position, the hookswitch 44 also is opened. The power supply 50 is rendered inoperative, and the system of FIGS. 4A and 4B is completely turned off. When the system is in the "on-hook" condition, the central office line voltage once again causes the threshold of the Zener diode 34 to be exceeded, which in turn causes the hookswitch 44 to be biased open as described above. The system then is ready to repeat any of the foregoing sequences of operation.

Only one of the optical switches, comprising the light-emitting diode 26 and the optical transistor 27, is shown in detail in the circuit of FIGS. 4A and 4B. The other optical switches included in the system may be the same as the combination 26/27. These include the light-emitting diode portion of the loop detector and slope control 38 and the control switch 40, as well as the user disable light-emitting diode 98 for controlling the optical switches 32. The receiving portion of these optical switch sets, however, may be of other forms other than the optical transistor 27, which is illustrated. For example, optical MOSFET transistors may be used, or optical silicon controlled rectifiers (SCRs) may be substituted for the optical transistors, such as the optical transistor 27. Other types of optical switches also may exist, which may be substituted directly for the various optical switches 27, 32, and 40 illustrated in the drawing.

In the event that a low voltage brown out should occur, which would cause the operating voltage on the terminal 51 from the power supply 50 to drop below a minimum threshold, a reset and brown out circuit 90 is provided. The threshold is established by means of a Zener diode 92 connected between the power supply terminal 51 and ground. The voltage across the Zener diode 92 is used to maintain a forward operating bias on a PNP transistor 93 to supply the power from the terminal 51 to the micro controller 52. Any time the available power supply voltage drops below the threshold of the Zener diode 92, it becomes non-conductive, which in turn causes the transistor 93 to become non-conductive. This then causes a termination of the operation of a micro controller 52 to reset the system to an initial operating condition.

The foregoing description of a preferred embodiment of the invention should be considered as illustrative, and not as limiting. The different types of optical switches which may be used, for example, are indicative of variations to the system which may be made without departing from the true scope of the invention. Various other changes and modifications will occur to those skilled in the art for accomplishing the same result, with substantially the same system, operating in substantially the same way, without departing from the true scope of the invention as defined in the appended claims.

What is claimed is:

1. A telephone line powered system for use with a telephone connected with said telephone line for operation therewith, said system including in combination;
   a normally open hookswitch;
   an auxiliary control system connected to said telephone line in parallel with said telephone through said hookswitch;
   a first hookswitch control operated by said telephone in an off-hook condition to close said hookswitch and supply power from said telephone line to said auxiliary control system to operate said auxiliary control system to a standby mode at a relatively low power consumption;
   a data input device for supplying data to said telephone line coupled with said auxiliary control system for switching said auxiliary control system to a higher power mode in response to a predetermined operation of said data input device; and
   a second hookswitch control operated by said auxiliary control system in said higher power mode to close said hookswitch transferring control of said telephone line from said telephone to said auxiliary control system and said data input device.

2. The combination according to claim 1 further including power disable circuit means coupled with said telephone line and said auxiliary control system for preventing the application of power from said telephone line to said auxiliary control system with said telephone in an "on-hook" condition of operation.

3. The combination according to claim 2 wherein said data input device is a card reader.

4. The combination according to claim 2 wherein said data input device is a key activated memory.

5. The combination according to claim 1 wherein said data input device is a card reader.

6. The combination according to claim 1 wherein said data input device is a key activated memory.

7. A telephone line powered system for use with a telephone operating between "on-hook" and "off-hook" conditions of operation, connected to a telephone line for operation therewith, said system including in combination:
   a telephone line powered device coupled with said telephone line and responsive to the "off-hook" operation of said telephone to switch to a stand-by mode of operation drawing operating power at a first relatively low level from said telephone line; and
   switch means coupled with said telephone powered device for causing said device to switch to an operating mode to receive power at a relatively high level from said telephone line and to disable said telephone, wherein said telephone line powered device in said operating mode supplies signals to said telephone line.

* * * * *